United States Patent [19]

Russ

[11] Patent Number: 4,567,781

[45] Date of Patent: Feb. 4, 1986

[54] STEADY POWER

[76] Inventor: Norman Russ, Box 508, Norwich, Conn. 06360

[21] Appl. No.: 618,941

[22] Filed: Jun. 8, 1984

[51] Int. Cl.⁴ .................... F16H 27/02; F16H 31/00
[52] U.S. Cl. ................................ 74/88; 74/126; 74/198
[58] Field of Search .............. 74/1, 64, 25, 88, 111, 74/126, 128, 144, 198, 206

[56] References Cited
U.S. PATENT DOCUMENTS 2,960,889  11/1960  Keyser ................................ 74/64
4,177,683  12/1979  Moses ................................ 74/198
4,498,357   2/1985  Makarov ............................. 74/64

Primary Examiner—Lawrence J. Staab
Attorney, Agent, or Firm—McCormick, Paulding & Huber

[57] ABSTRACT

A reciprocating input rod lifts a heavy ball up an inclined circular track that provides a path for the ball to roll down by gravity. The ball's speed of rotation causes the track itself to rotate and this rotation provides useful output energy of rotation.

5 Claims, 3 Drawing Figures

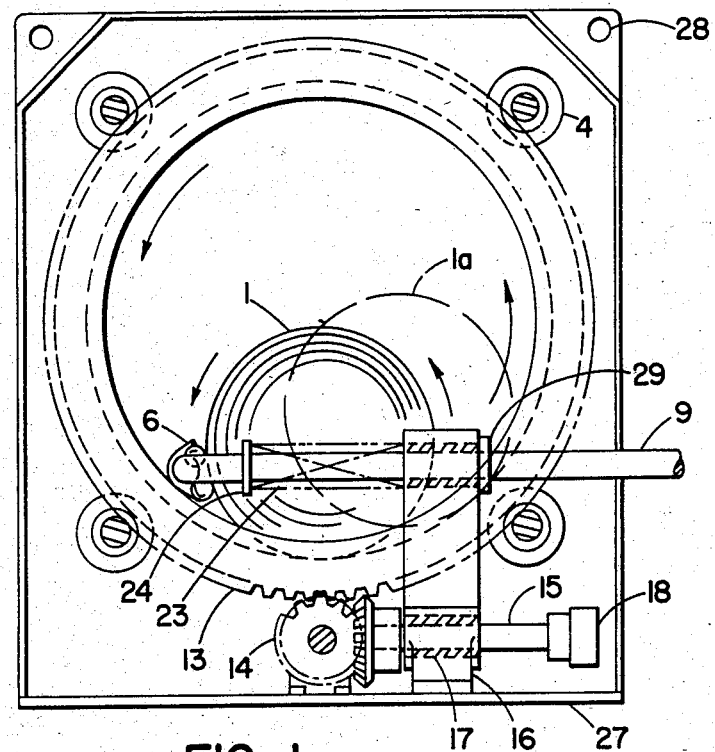
FIG. I
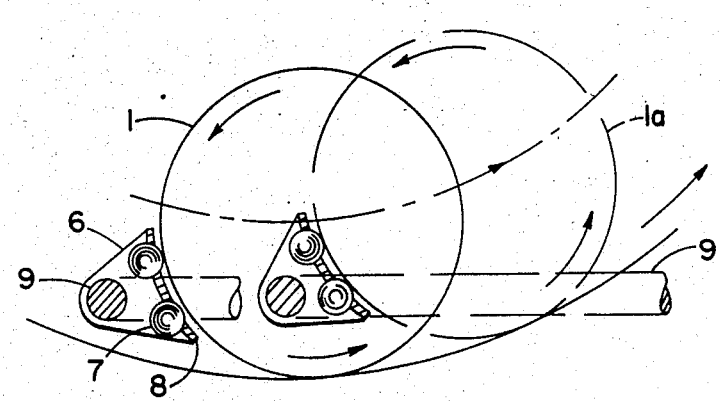
FIG. III

STEADY POWER

This invention relates generally to devices for converting linear motion to rotary motion, and deals more particularly with a device for converting intermittent linear reciprocating motion to continuous rotary motion. The invention provides for continuity of the rotary output motion in spite of any interruptions in the reciprocatory linear input motion.

In accomplishing the foregoing I have provided a frame defining a circular path for an annular raceway, and a ball in the raceway so that the ball normally occupies a position at the bottom of the raceway until and unless the ball is set into motion by a linearly movable elongated input member.

The input member or rod is longitudinally movable in a guideway defined by the frame and the frame also has circumaxially spaced roller elements mounted therein so as to define a circular path with a horizontal central axis spaced equidistantly from these roller elements. The raceway moves in a vertical plane around a central axis and in this circular path such that the inner surface of the raceway defines an internally facing circular track for the ball. Two axially spaced tracks are provided to define this raceway track for spherical ball. The input member or rod has ball engaging means mounted at one end for engaging the ball between the ball's center of rotation and the inner surface of the circular track. The said ball engaging means has low friction contact with the ball so that the ball can be slid up the track and allowed to rotate back down the track causing rotation of the track itself due to normal inertia forces.

BRIEF DESCRIPTION OF THE DRAWINGS

FIG. I is a vertical sectional view showing the mechanism in elevation.

FIg. II is a sectional view taken through one of the roller elements defining the circular path for the annular track. This view shows the ball located at the bottom of the track with no motion of the ball and raceway.

Figure 11:
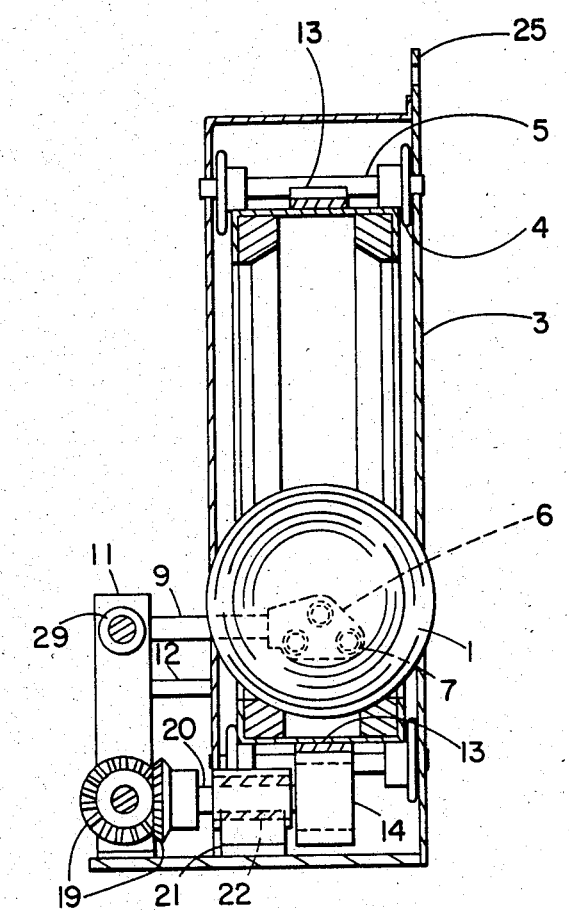

FIG. III is a schematic view illustrating the relative velocities of the ball and track as the ball is moved from its rest position in the track by pulling on the elongated member or rod from left to right.

DETAILED DESCRIPTION

Turning now to the drawings in greater detail, a relatively heavy spherical ball 1 is provided in a circular raceway defined by axially spaced rings 3, 3 which rings are held in a cage assembly such that the raceway is supported for rotation between a plurality of roller elements 4, 4. These roller elements are located in circumaxially spaced relationship around a horizontally extending central axis defined by a fixed frame 25, 26, 27 and 28.

As so arranged the raceway 3 is free to rotate with respect to this central axis, and the ball is free to travel around the inside of the raceway except insofar as it's motion is controlled by elongated input member or actuating rod 9, and more particularly by the assembly 6 provided at the inner end of this rod or shaft 9.

The input actuator rod 9 is slidably received in the fixed frame, and more particularly in housing 11. The rod 9 is spring biased by return spring 23 toward the position shown in solid lines wherein the assembly of rollers 6 at the end of actuating rod 9 is adapted to support the spherical ball 1 in a so-called neutral or rest position [See FIGS. I, II and III]. The actuator rod assembly of rollers 6 includes a plurality, preferably 3 rollers 7, 7, to locate the ball in this position. This configuration also permits the ball to be rollably engaged, that is to permit relative rotation between the ball and the actuator rod assembly 6.

When actuating rod 9 is moved from left to right ball 1 is caused to move from the solid line position shown to that indicated by the broken lines in FIG. III. Counterclockwise rotation of the ball as suggested by the arrows is achieved because the rod assembly 6 engage the ball 1 generally between the center of the ball and the raceway itself. This results in the ball sliding relative to the initially stationary raceway cage 3.

At the end of a predetermined stroke for actuating rod 9 the spring 23 returns the actuator rod 9 and assembly 6 to the neutral position shown, and ball 1 rolls down the lower right hand quadrant of the raceway 3 as viewed in FIG. I. This causes further counterclockwise rotation of the ball and also of the raceway itself. The reactionary forces between the downwardly rolling ball and the raceway 3 are such that a coasting action is achieved similar to that achieved by a conventional coaster brake in a bicycle. That is when the rider of the bicycle ceases pedaling the bicycle will continue to free wheel. This is also true of the above described mechanism. Stops 24 and 29 are provided on the actuating rod 9 as shown. These stops serve to limit the power and return strokes of rod 9.

Depending upon the angular speed of rotation for the ball 1, and the relative friction between the ball and the raceway 3 further strokes can be applied to the actuating rod 9 that will serve to increase the energy transferred between the rotating ball and the raceway itself. It is possible to apply a continuous reciprocating motion to the rod causing increasing speed for the spherical ball 1 and thereby achieve a continuous angular acceleration of the raceway 3. This energy of the rotating ball on raceway 3 can be extracted from the system by means of a gear train that includes a ring gear provided externally of the raceway as shown at 13 at FIGS. I and II. Further, a spur gear 14 is provided to mesh with the ring gear and a pair of right angle gears 19 and 20 drive output shaft 15 on an axis that is arranged generally parallel to the direction of motion for the actuating rod.

I claim:

1. A mechanism for converting linear reciprocating motion to continuous rotary motion and comprising in combination,
   (a) a frame defining at least one longitudinally extending guideway,
   (b) an elongated input member slidably received in said guideway,
   (c) said frame defining a circular path in said frame, said path having a horizontal central axis,
   (d) annular raceway means for rotation mounted in said circular path for movement in a vertical plane around said central axis, said raceway means defining an internal track also circular in contour,
   (e) a spherically contoured ball of smaller diameter then that of said circular track and provided in said raceway means, said ball adapted to be rotated in one direction by rotation of said raceway means in said one direction, and
   (f) ball engaging means mounted on said elongated input member and adapted to engage said ball between the ball's center of rotation and the said circular track whereby to move the ball up the track by causing the ball to slide on the track rather than to rotate in a direction opposite said one direction.

2. The mechanism of claim 1 further characterized by circular gear means on said annular raceway, and an output shaft coupled to said circular gear means.

3. The mechanism of claim 1 wherein said ball has a far greater moment of inertia than that of said raceway due to the formers greater mass.

4. The mechanism of claim 1 wherein said ball engaging means comprises an assembly of at least three rollers so mounted on said input member that they are engageable with said ball to minimize friction between the ball engaging means and the ball itself.

5. The mechanism of claim 1 wherein said circular path is defined by a plurality of circumaxially spaced roller elements arranged equidistantly relative to one another in said frame and equally spaced relative to said central axis.

* * * * *